(12) United States Patent
Patel et al.

(10) Patent No.: US 10,234,142 B2
(45) Date of Patent: Mar. 19, 2019

(54) FUEL DELIVERY METHODS IN COMBUSTION ENGINE USING WIDE RANGE OF GASEOUS FUELS

(71) Applicant: Solar Turbines Incorporated, San Diego, CA (US)

(72) Inventors: Rajeshriben Patel, San Diego, CA (US); James Scott Piper, Bonita, CA (US); Raymond Alvarez, La Mesa, CA (US); Rasoul Paydar, San Diego, CA (US); Ram Srinivasan, San Diego, CA (US); Edouard Bahous, San Diego, CA (US)

(73) Assignee: Solar Turbines Incorporated, San Diego, CA (US)

(*) Notice: Subject to any disclaimer, the term of this patent is extended or adjusted under 35 U.S.C. 154(b) by 278 days.

(21) Appl. No.: 15/130,037

(22) Filed: Apr. 15, 2016

(65) Prior Publication Data
US 2017/0299190 A1 Oct. 19, 2017

(51) Int. Cl.
*F23R 3/14* (2006.01)
*F23R 3/28* (2006.01)
(Continued)

(52) U.S. Cl.
CPC ............ *F23R 3/36* (2013.01); *F02C 7/22* (2013.01); *F23R 3/14* (2013.01); *F23R 3/286* (2013.01);
(Continued)

(58) Field of Classification Search
CPC .... F23R 3/14; F23R 3/28; F23R 3/286; F23R 3/34; F23R 3/36; F23R 3/346; F23R 3/343; F02C 3/20; F02C 7/22; F02C 7/222; F02C 7/228; F02C 7/232; F02C 7/236; F23C 2900/07001
See application file for complete search history.

(56) References Cited

U.S. PATENT DOCUMENTS 4,761,948 A * 8/1988 Sood .................. F23R 3/286
4,833,878 A * 5/1989 Sood .................. F02C 9/40
60/39.463

(Continued)

FOREIGN PATENT DOCUMENTS

EP 2918815 6/2010
EP 1883750 B1 12/2011
(Continued)

*Primary Examiner* — William H Rodriguez
(74) *Attorney, Agent, or Firm* — Mattingly Burke Cohen & Biederman

(57) ABSTRACT

A fuel injector for a combustion engine includes an injector head including a nozzle, a premixer, and a distributor structured to distribute a plurality of different fuels to different sets of fueling orifices in the premixer. A pilot assembly of the fuel injector is coupled to the premixer and includes a first fueling passage for a first fuel and a second fueling passage for a second fuel. Multiple sets of fueling orifices are positioned within the fuel injector, the fueling orifice sets being selectively connectable to a plurality of different fuel supplies, and both located and sized so as to accommodate a wide range of flow rates to enable a combustion engine coupled with the fuel injector to operate on fuels having a range of Wobbe numbers and compositions.

15 Claims, 4 Drawing Sheets

(51) Int. Cl.
*F23R 3/36* (2006.01)
*F02C 7/22* (2006.01)

(52) U.S. Cl.
CPC ...... *F05D 2220/32* (2013.01); *F05D 2220/75* (2013.01); *F05D 2240/35* (2013.01); *F05D 2240/60* (2013.01); *F23C 2900/07001* (2013.01); *F23R 2900/00002* (2013.01)

(56) References Cited

U.S. PATENT DOCUMENTS

| | | | | |
|---|---|---|---|---|
| 5,451,160 | A * | 9/1995 | Becker | F23D 17/002 431/183 |
| 5,666,890 | A * | 9/1997 | Craig | F02C 3/20 110/218 |
| 5,680,766 | A * | 10/1997 | Joshi | F23C 7/004 239/405 |
| 6,148,603 | A * | 11/2000 | Althaus | F23R 3/28 60/39.465 |
| 6,201,029 | B1 * | 3/2001 | Waycuilis | C01B 3/382 252/373 |
| 6,237,343 | B1 | 5/2001 | Butler | |
| 7,111,452 | B2 | 9/2006 | Miyoshi et al. | |
| 7,121,481 | B2 | 10/2006 | Berglund et al. | |
| 7,608,011 | B2 | 10/2009 | Grabowski et al. | |
| 7,802,434 | B2 | 9/2010 | Varatharajan et al. | |
| 8,037,689 | B2 | 10/2011 | Oskin et al. | |
| 8,065,880 | B2 * | 11/2011 | Ishizaka | F23R 3/286 60/737 |
| 8,240,150 | B2 | 8/2012 | Varatharajan et al. | |
| 8,266,911 | B2 | 9/2012 | Evulet | |
| 8,272,368 | B2 | 9/2012 | Wickstone | |
| 8,316,645 | B2 * | 11/2012 | Lee | F23R 3/14 239/399 |
| 8,443,608 | B2 | 5/2013 | Williams | |
| 8,707,707 | B2 | 4/2014 | Venkataraman et al. | |
| 8,806,848 | B2 * | 8/2014 | Koizumi | F23R 3/12 60/39.463 |
| 8,991,187 | B2 | 3/2015 | Hughes et al. | |
| 9,593,847 | B1 * | 3/2017 | Zink | F23D 14/58 |
| 2002/0014078 | A1 * | 2/2002 | Mandai | F23R 3/286 60/737 |
| 2003/0164410 | A1 | 9/2003 | Steinthorsson et al. | |
| 2004/0006989 | A1 * | 1/2004 | Stuttaford | F23R 3/286 60/776 |
| 2005/0268618 | A1 * | 12/2005 | Johnson | F23R 3/14 60/776 |
| 2008/0267783 | A1 * | 10/2008 | Kraemer | F23R 3/14 416/90 R |
| 2008/0289341 | A1 * | 11/2008 | Ishizaka | F23R 3/14 60/748 |
| 2009/0025395 | A1 * | 1/2009 | Nilsson | F23C 7/004 60/748 |
| 2009/0111063 | A1 | 4/2009 | Boardman et al. | |
| 2009/0241547 | A1 * | 10/2009 | Luts | F02C 7/22 60/737 |
| 2009/0272117 | A1 * | 11/2009 | Wilbraham | F23C 7/004 60/748 |
| 2009/0277179 | A1 * | 11/2009 | Wilbraham | F23C 7/004 60/748 |
| 2009/0301092 | A1 * | 12/2009 | Wilbraham | F23R 3/14 60/748 |
| 2010/0077760 | A1 * | 4/2010 | Laster | F23C 7/004 60/742 |
| 2010/0146979 | A1 * | 6/2010 | Headland | F23C 7/004 60/737 |
| 2010/0170255 | A1 * | 7/2010 | Zuo | F23R 3/14 60/748 |
| 2010/0180599 | A1 * | 7/2010 | Thomas | F23R 3/14 60/737 |
| 2010/0183991 | A1 * | 7/2010 | Kostlin | F23C 7/004 431/9 |
| 2010/0223932 | A1 * | 9/2010 | Wilbraham | F23C 7/004 60/772 |
| 2010/0263381 | A1 * | 10/2010 | Ishizaka | F23R 3/14 60/737 |
| 2010/0269508 | A1 * | 10/2010 | Saito | F23R 3/14 60/748 |
| 2010/0287938 | A1 * | 11/2010 | Singh | F23C 7/004 60/740 |
| 2010/0319353 | A1 * | 12/2010 | Intile | F23R 3/286 60/772 |
| 2011/0005189 | A1 * | 1/2011 | Uhm | F23D 14/82 60/39.281 |
| 2011/0107769 | A1 * | 5/2011 | Stevenson | F01D 9/04 60/772 |
| 2011/0113784 | A1 * | 5/2011 | Headland | F02C 7/22 60/737 |
| 2011/0138815 | A1 * | 6/2011 | Headland | F23C 7/004 60/772 |
| 2012/0042655 | A1 | 2/2012 | Lam | |
| 2012/0291446 | A1 * | 11/2012 | Hirata | F23D 11/402 60/772 |
| 2014/0097276 | A1 * | 4/2014 | Boardman | F23D 11/103 239/589 |
| 2014/0283524 | A1 * | 9/2014 | Li | F02C 3/20 60/776 |
| 2014/0332602 | A1 | 11/2014 | Cramb et al. | |
| 2015/0047361 | A1 | 2/2015 | Williams et al. | |
| 2015/0275755 | A1 * | 10/2015 | Ogata | F02C 3/22 60/39.463 |
| 2015/0276225 | A1 | 10/2015 | Kapilavai | |
| 2016/0305666 | A1 * | 10/2016 | Bulat | F23N 3/007 |
| 2017/0009994 | A1 * | 1/2017 | Buchanan | F23Q 3/008 |
| 2017/0298875 | A1 * | 10/2017 | Patel | F02M 29/06 |
| 2017/0298884 | A1 * | 10/2017 | Patel | F02M 43/04 |
| 2017/0321609 | A1 * | 11/2017 | Ogata | F02C 7/228 |
| 2017/0356656 | A1 * | 12/2017 | Ogata | F23R 3/286 |

FOREIGN PATENT DOCUMENTS

| | | |
|---|---|---|
| JP | 2006057504 | 3/2006 |
| JP | 04380465 B2 | 12/2009 |
| JP | 2011252494 A | 12/2011 |

* cited by examiner

FUEL DELIVERY METHODS IN COMBUSTION ENGINE USING WIDE RANGE OF GASEOUS FUELS

TECHNICAL FIELD

The present disclosure relates generally to gaseous fuel delivery and operation of combustion engines, and more particularly to apparatus and methodology for operating a combustion engine on a range of fuel types.

BACKGROUND

Combustion engines are well-known and widely used for vehicle propulsion, power generation, for driving pumps and compressors, and for all manner of other applications. Burning virtually any combustible fuel produces certain emissions, and in many cases elimination or reduction in the relative amounts of such emissions is desirable. Smoke in the nature of unburned hydrocarbons and partially burned hydrocarbons is generally undesirable, especially in populated areas. Various oxides of nitrogen known collectively as NOx are well-known contributors to smog and the like. Significant advances in engine operating technology and construction and advanced exhaust treatment techniques have contributed to reduced emissions and cleaner air over the last several decades. For instance, so-called lean burn conditions where fuel is combusted with a stoichiometric excess of oxygen, and premixing where fuel and air are first mixed prior to being subjected to ignition conditions, have been shown to advantageously reduce certain emissions. Pilot fuels, combustion chamber shapes, particulate filters, exhaust treatment by way of selective catalytic reduction (SCR) and many other technologies exist for emissions control and efficiency optimization.

Accompanying increased interest in reduced emissions has been an expanded availability and incentives to exploit certain types of fuels less traditionally used in combustion engine, such as the various forms of biodiesel, reformed or bottled hydrogen fuel, alcohol fuels, landfill gas, and gaseous fuel derived from biomass. For at least some applications and engine designs, such fuels can burn with reduced emissions of certain types, and are also increasingly available as substitutes for more traditional fuels such as petroleum-derived hydrocarbons. Engineers are increasingly discovering, however, that engine designs, components and operating technologies may have benefits and advantages with respect to certain fuel types or classes but have more limited application or even disadvantages with respect to other fuel types or classes. U.S. Pat. No. 8,991,187 to Hughes et al. is directed to a Combustor With A Lean Pre-Nozzle Fuel Injection System. Hughes et al. appear to disclose a combustor that includes fuel nozzles, and a lean pre-nozzle fuel injection system upstream of the fuel nozzles to premix flows of fuel and air. While Hughes et al. may achieve their stated objectives, there is always room for improvement.

SUMMARY

In one aspect, a fuel injector includes an injector head having a nozzle defining a longitudinal axis and being structured to fluidly connect with a combustor in a combustion engine, a premixer coupled with the nozzle, and a fuel distributor coupled with the premixer. The fuel injector further includes a plurality of fuel delivery conduits coupled with the injector head. The premixer defines a plurality of flow channels each extending between an upstream end that forms an opening in the fuel injector structured to receive inflowing air into the fuel injector, and a downstream end. The premixer further has formed therein a plurality of fueling orifices positioned to deliver fuel into the plurality of flow channels, and being arranged in a first orifice set positioned adjacent to the corresponding upstream end, a second orifice set positioned adjacent to the corresponding downstream end, and a third orifice set. The distributor forms a first fuel gallery fluidly connecting a first one of the plurality of fuel delivery conduits with the first and the third sets of fueling orifices, and a second fuel gallery fluidly connecting a second one of the plurality of fuel delivery conduits with the second set of fueling orifices.

In another aspect, a fuel injector head assembly includes a premixer structured to couple with a nozzle, and defining a plurality of flow channels each extending between an upstream end that forms an opening in the fuel injector head assembly structured to receive inflowing air into the fuel injector head assembly, and a downstream end. The premixer further has formed therein a plurality of fueling orifices positioned to deliver fuel into the plurality of channels, and being arranged in a first orifice set positioned adjacent to the corresponding upstream end, a second orifice set positioned adjacent to the corresponding downstream end, and a third orifice set. The assembly further includes a distributor coupled with the premixer and having a plurality of fuel inlets formed therein, the distributor forming a first fuel gallery fluidly connecting a first one of the fuel inlets with the first and the third sets of fueling orifices, and a second fuel gallery fluidly connecting a second one of the fuel inlets with the second set of fueling orifices.

In still another aspect, a method of staged fuel delivery in a combustion engine includes feeding air into a plurality of flow channels in a premixer of a fuel injector. The method further includes injecting a first proportion of a gaseous fuel to be combusted in the combustion engine at an upstream location within the premixer into a flow of the air entering the plurality of flow channels. The method further includes injecting a second proportion of the gaseous fuel at a downstream location within the premixer into a flow of the air mixed with the gaseous fuel injected upstream, and injecting a third proportion of the gaseous fuel at a third location within the premixer different from the upstream and the downstream locations. The method still further includes directing the mixed air and gaseous fuel injected at the upstream, downstream and third locations through a nozzle of the fuel injector and into a combustor of the combustion engine.

DETAILED DESCRIPTION

Figure 1:
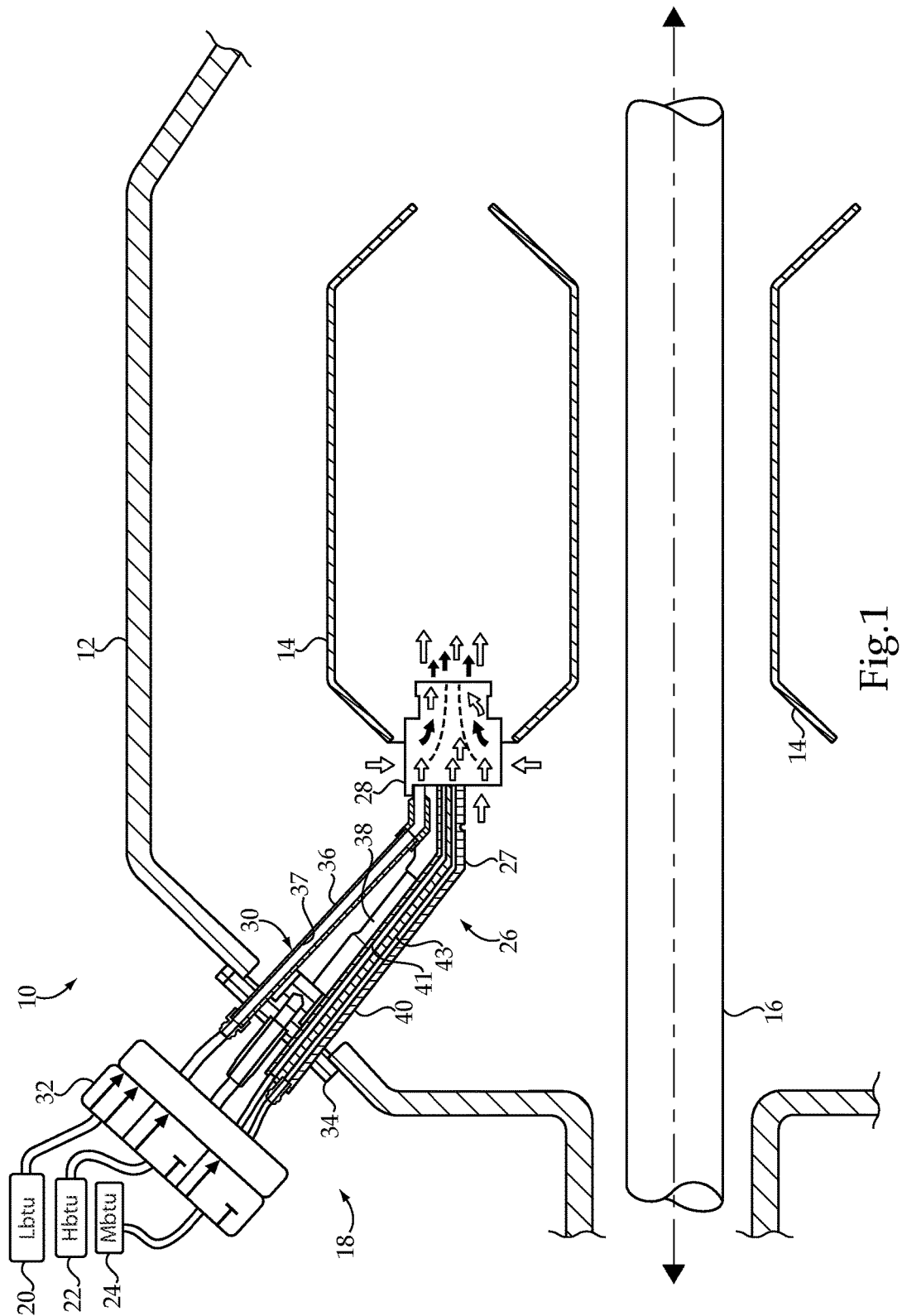
FIG. 1 is a partially sectioned side diagrammatic view of a portion of a combustion engine, according to one embodiment.

Referring to FIG. 1, there is shown a combustion engine 10 according to one embodiment. In a practical implementation strategy, engine 10 includes a gas turbine engine having a housing or pressure casing 12, a combustor 14, and a shaft 16 rotatable within pressure casing 12. Rotatable components in the nature of a compressor and a turbine can be coupled to rotate with shaft 16 in a generally conventional manner. Still other components known to those skilled in the art such as a geartrain or gearbox, one or more drive shafts coupled with a pump, compressor, prop, or vehicle traction elements, can be driven by way of the rotation of shaft 16 in a conventional manner. Engine 10 further includes a fuel system 18 that includes a plurality of different fuel supplies 20, 22, and 24 that may contain, by way of example, a plurality of different fuels including a low BTU or low heating value fuel, a high BTU or high heating value fuel, and a medium BTU or medium heating value fuel, respectively. The terms heating value and calorific value are used generally interchangeably herein. Each of the fuels can be a gaseous fuel, or a fuel stored in liquid form but convertible to gaseous form for use in engine 10. Equipment for converting liquid fuels to gaseous form could be part of fuel system 18 in certain embodiments. In still other instances, engine 10 could also be equipped with a reformer or the like for producing hydrogen and/or hydrogen-rich fuels for use in engine 10.

An example high BTU fuel according to the present disclosure could include natural gas having a Wobbe index of about 1000 BTU/scf or greater, whereas an example medium BTU fuel could be landfill gas having a Wobbe index of about 500 BTU/scf, and an example low BTU fuel could be gaseous fuel derived from biomass that contains carbon monoxide and is relatively rich in hydrogen, and having a Wobbe index of about 200 BTU/scf, or possibly lower. As used herein it should be understood that relative terms such as higher or lower or medium are to be understood in reference to each other. Thus, a gaseous fuel could be considered a "medium" calorific value fuel relative to a first fuel but could be considered a "higher" calorific value fuel relative to a second fuel. Fuel system 18 further includes one or more fuel injectors 26 coupled with combustor 14 in engine 10 in a generally conventional manner. In a practical implementation strategy, engine 10 includes a plurality of identical fuel injectors, thus the description herein of a single fuel injector 26 should be understood to apply analogously to any of a plurality of fuel injectors that might be part of fuel system 18. For reasons which will be further apparent from the following description, fuel system 18 is uniquely structured to operate with a wide range of calorific value fuels, in other words, a range of Wobbe index fuels, and to transition seamlessly from operation on one type of fuel to operation on another type of fuel. The broad applicability of the present disclosure to operation with different fuel types can be available in many instances without substantial degradation in emissions generally, and is suited to lean-burn, dry combustion strategies, as further described herein.

Figure 2:
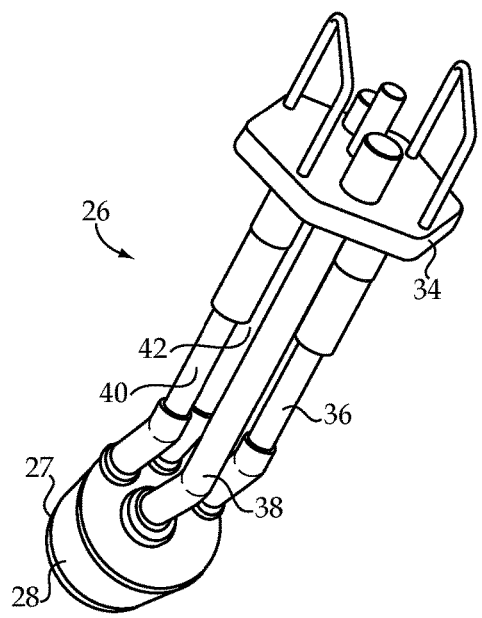
FIG. 2 is a diagrammatic view of a fuel injector, according to one embodiment.

Referring also now to FIG. 2, fuel system 18 further includes a fuel flow control mechanism 32 coupled between fuel supplies 20, 22 and 24, and fuel injector 26, and structured to fluidly connect each one of fuel supplies 20, 22, and 24 to fuel injector 26 so as to operate engine 10 on the corresponding one of the fuels. In a practical implementation strategy, fuel injector 26 includes an injector body 27 of which an injector head 28 and an injector stem 30 are parts. Injector head 28 is structured to couple with combustor 14. As further described herein, injector head 28 is structured to convey a mixture containing air and the one of the gaseous fuels it is supplied with at any given time into combustor 14. In FIG. 1 solid arrows generally depict gaseous fuel flow whereas open arrows generally depict incoming air. It can be noted air, such as compressed air supplied from a compressor of engine 10, is shown flowing into injector head 28 from a plurality of different directions, and commences mixing with the gaseous fuel within injector head 28 prior to delivery into a combustion space within combustor 14.

As noted above, mechanism 32 may be provided so as to enable a different one of a plurality of fuels to be supplied to fuel injector 26 for delivery to combustor 14. To this end, mechanism 32 could include any of a variety of different valve and valve body structures, actuators, and other known hardware that enables an incoming gaseous fuel flow to be switched for another incoming gaseous fuel flow so as to switch operation of engine 10 among the three or more different fuel types. Those skilled in the art will recognize the desirability of being able to switch among multiple fuel types but using the same fuel injector(s) and without sacrificing performance. In a practical implementation strategy, injector stem 30 includes a plurality of fuel supply conduits coupled with injector head 28, and in particular fluidly connecting fuel supplies 20, 22, and 24 to each of a main fueling assembly and a pilot fueling assembly of injector 28 to be further described below. In the illustrated embodiment, the plurality of fuel supply conduits includes a first fuel supply conduit 36 having a first fuel passage 37 formed therein, a second fuel supply conduit 38 having a second fuel passage (not visible in FIG. 1) formed therein, a third fuel supply conduit 40 having a third fuel passage 41 and a fourth fuel passage 43 formed therein, and a fourth fuel supply conduit 42 also having a fuel passage therein that is not visible in the sectioned view of FIG. 1.

In a practical implementation strategy fuel passages 41 and 43 are structured to fluidly connect with a first one of fuel supplies 22, 20, and 24, and a second one of fuel supplies 22, 20, and 24, respectively. When operating engine 10 on a first gaseous fuel, one of fuel passages 41 and 43 can be used to supply fuel to the pilot fueling assembly of injector head 28, and when operating engine 10 on a second gaseous fuel the other of fuel passages 41 and 43 can be used. The other fuel supply conduits 36 and 38 and 42 are typically used to supply fuel to the main fueling assembly of injector head 28, as further described herein. FIGS. 1 and 2 also illustrate certain other features of injector 26, including a main block 34 equipped with handles or the like, structured for coupling injector 26 to pressure casing 12.

Figure 3:
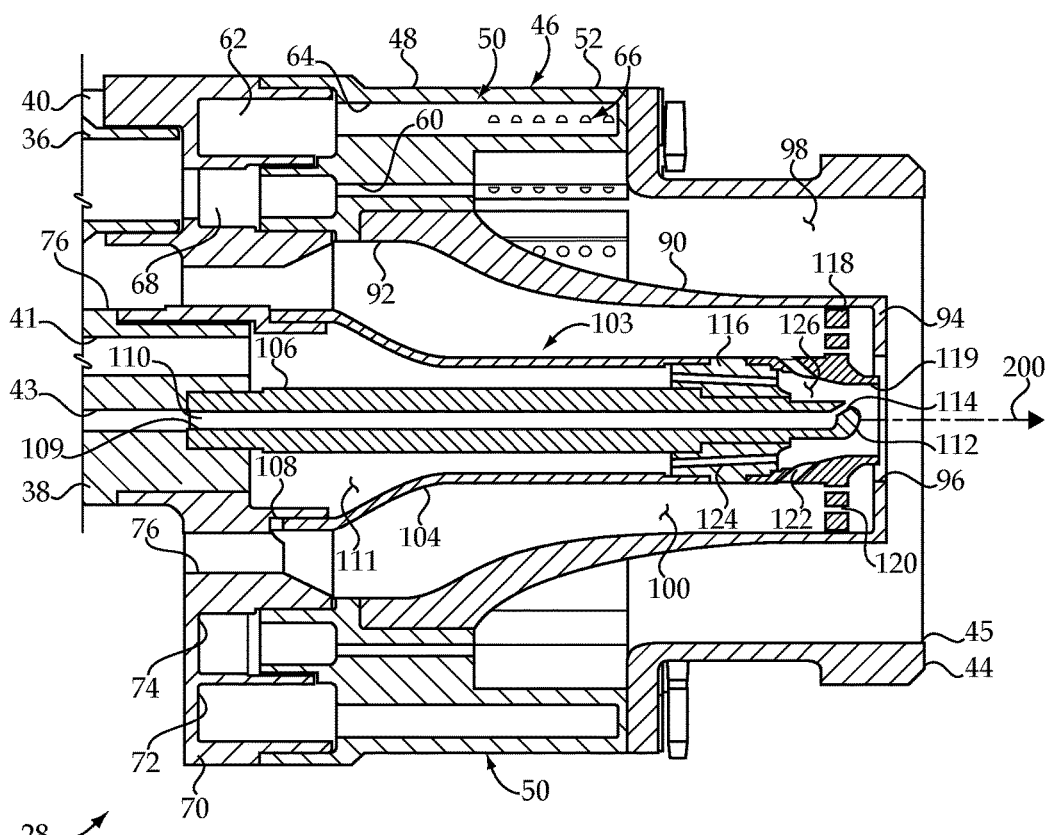
FIG. 3 is a sectioned side diagrammatic view of a portion of the fuel injector of FIG. 2.

Referring also now to FIG. 3, there is shown a sectioned view through injector head 28 illustrating features of injector 26 in greater detail. As mentioned above injector head 28 may include a main fueling assembly 46 and a pilot fueling assembly 103. Main fueling assembly 46 is structured to provide a main flow of air and one of a plurality of different fuels from fuel supplies 20, 22, and 24, and may include a premixer 48 in the form of a swirler structured to swirl a mixture containing the fuel and air for delivery to combustor 14 as further described herein. Premixer 48 may include a front end 49 that faces toward combustor 14, and a back end 51. Premixer 48 further has therein a plurality of flow channels 50 structured to receive inflowing air, and a plurality of sets of fueling orifices 58, 60 and 66 in fluid communication with flow channels 50 and each structured to fluidly connect with at least one of the plurality of different fuel supplies 20, 22, and 24.

Pilot fueling assembly 103 is structured to provide a pilot flow of air and one of the plurality of different fuels, and includes therein a plurality of fuel inlets 108 and 109 each structured to fluidly connect with at least one, but typically only one, of fuel supplies 20, 22, and 24. Pilot fueling assembly 103 also includes therein an injection outlet 119 fluidly connected with each of fuel inlets 108 and 109, and an air inlet 122 fluidly connected with injection outlet 119.

As further described herein it will be understood that fueling orifices 58, 60 and 66 may all be fluidly connected with the same one of fuel supplies 20, 22, and 24 at the same time, or only some of orifices 58, 60 and 66 can be fluidly connected with the same one of fuel supplies 20, 22 and 24 at the same time. Still other proportioning combinations are contemplated as further discussed herein. Injection outlet 119 could be considered a fueling orifice at least in certain instances. Typically, only one of fuel passages 41 and 43 will be conveying fuel to pilot assembly 103 at any given time, although the present disclosure is not strictly limited as such.

As will be further apparent from the following description the multiple sets of fueling orifices and the means for selectively fluidly connecting some of the fueling orifices together or separately to any one of fuel supplies 20, 22, and 24 is contemplated to assist in making injector 26 suitable for different fuel types, as factors such as fuel flow rates, fuel delivery locations, resistance to flashback and provision of a specified pressure drop across injector 26 can be achieved for any of a plurality of different fuels having a range of calorific values. Operating examples are contemplated where engine 10 is operated for a time on a first fuel, with the first fuel being delivered through only certain of the fueling orifices, and then engine 10 is operated for a time on a second fuel, with the second fuel being delivered through other ones or all of the fueling orifices.

In one practical implementation strategy, pilot fueling assembly 103 includes a tube assembly and defines a longitudinal axis 200, and is positioned at least partially within premixer 48. Flow channels 50 may be arranged circumferentially about longitudinal axis 200 and radially outward of pilot assembly 103. More particularly, fuel injector 26 may include a premix barrel 90, and pilot assembly 103 may be positioned at least partially within premix barrel 90 and includes an outer tube member 104 and an inner tube member 106. Premix barrel is smoothly tapered it can be noted, and assists in minimizing or eliminating recirculation zones by ensuring acceleration of flow toward combustor 14. The shaped barrel design, among other features of injector 26, enables operation on hydrogen-rich fuels without significant risk of flashback.

Inner tube member 106 defines a first fuel passage 110 extending between fuel inlet 109 and injection outlet 119. A second fuel passage 111 is formed between inner tube member 106 and outer tube member 104 and extends between fuel inlet 108 and injection outlet 119. In a practical implementation strategy fuel passage 41 feeds fuel inlet 108 and fuel passage 43 feeds fuel inlet 109. Pilot assembly 103, more particularly the tube assembly thereof, further includes a tip piece 118 coupled to outer tube member 106 and supporting the tube assembly within barrel 90, and a holder piece 118 supporting inner tube member 106 within outer tube member 104. A tip chamber 126 may be formed in part by tip piece 118 and in part by inner tube member 106 and is structured to feed a pilot flow of air and fuel to injection outlet 119. An air feed conduit 100 is formed between premix barrel 90 and outer tube member 104. One or more air feed holes 122 formed in tip piece 118 as noted above serve as air inlets that fluidly connect conduit 100 to chamber 126. In a practical implementation strategy tip piece 118 also has a plurality of cooling air holes 120 formed therein that convey air from conduit 100 toward a tip (not numbered) of barrel 90 and toward injection outlet 119, thus providing air cooling to more distal parts of pilot assembly 103 and also barrel 90. Holder piece 116 has a plurality of fuel feed holes 124 from second fuel passage 111 to chamber 126. A fuel outlet 114 formed in inner tube member 106 feeds fuel from passage 110 into chamber 126. It can be noted that cooling air is provided to mix with fuel whether the fuel is supplied by way of passage 110 or passage 111. In a practical implementation strategy, a relatively greater flow area for fuel may be provided by second passage 111 than by first passage 110. Operating engine on relatively lower calorific value fuels commonly requires relatively greater flow rates due to the reduced energy density. For instance, when operating engine 10 on hydrogen-rich biomass-derived fuel the pilot fueling may include delivery of fuel by way of passage 111, whereas when operating engine 10 on natural gas the pilot fueling may include delivery of fuel by way of passage 110. It can be noted that inner tube member 106, outer tube member 104, and premix barrel 90 are arranged coaxially in the FIG. 3 illustration, although the present disclosure is not strictly limited as such.

Figure 4:
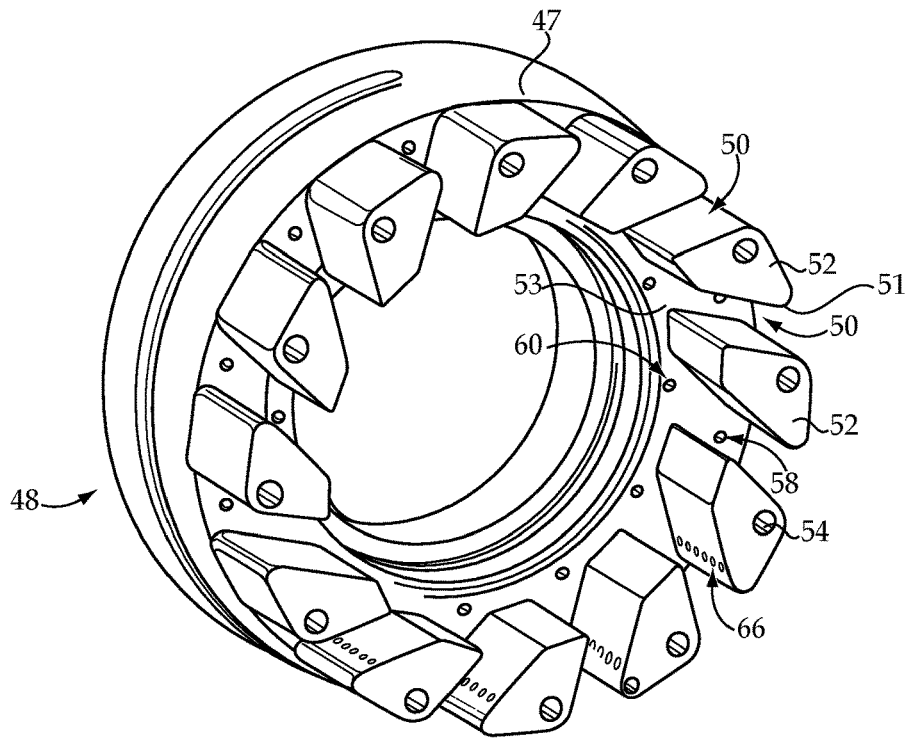
FIG. 4 is a perspective view of a swirler suitable for use in a fuel injector, according to one embodiment.
Figure 5:
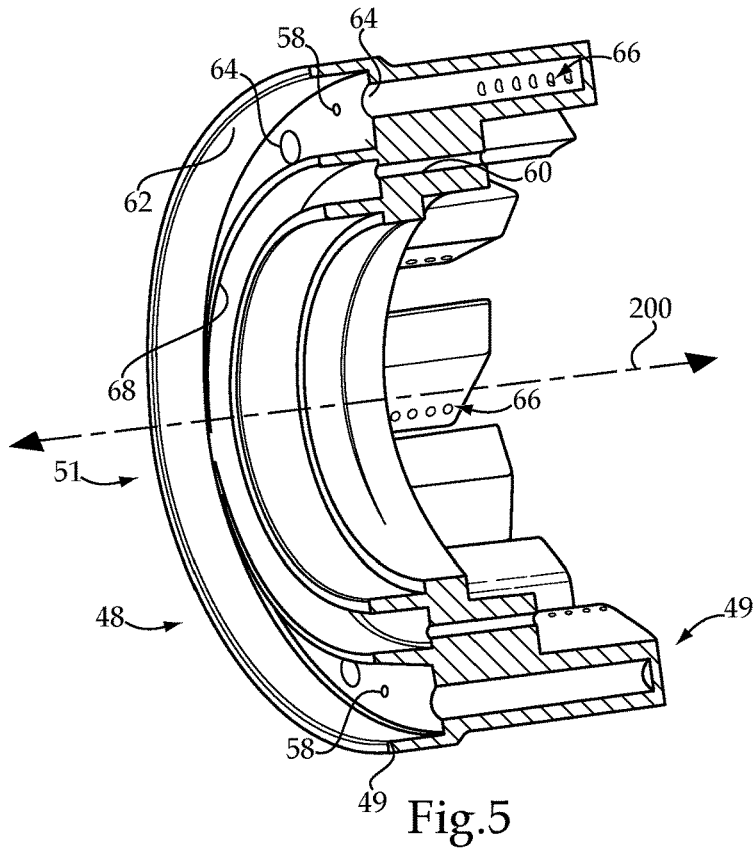
FIG. 5 is a sectioned view through the swirler of FIG. 4.

As noted above premixer 48 includes flow channels 50 therein. In a practical implementation strategy, flow channels 50 may be formed by a plurality of flow-directing structures 52. The geometry of the flow-directing structures may be different from that shown in the illustrated embodiments. Referring also now to FIGS. 4 and 5, structures 50 may have the form of vanes in one embodiment that are distributed circumferentially about longitudinal axis 200, and shaped and oriented such that flow channels 50 each extend radially inward toward barrel 90. Each of flow channels 50 also extend between upstream ends 51 and downstream ends 53 and may be oriented such that upstream ends 51 are positioned radially outward and downstream ends 53 are positioned radially inward. Upstream ends 51 form openings in fuel injector 26 that are structured to receive inflowing air into injector 26, and downstream ends 53 are structured to convey a mixture containing air and an injected fuel to passage 98 for conveying into combustor 14. As noted above premixer 48 can include a plurality of fueling orifices therein positioned to deliver fuel into flow channels 50. In a practical implementation strategy, the plurality of fueling orifices are arranged in a first fueling orifice set 58 positioned such that each is adjacent to the corresponding upstream end 51. A second fueling orifice set 60 is positioned adjacent to the corresponding downstream end 53. Premixer 48 may include a base 47 and each of orifice sets 58 and 60 may be formed in base 47. A third fueling orifice set 66 is provided and may be formed within structures 50 and located fluidly between the corresponding upstream ends 51 and downstream ends 53, or potentially at the same radial distance from axis 200 as are orifices 58. As used herein it should be appreciated that the terms "first," "second," and "third" are not used in a limiting sense and are for ease of description only. Thus, for purposes of description orifice set 58 could be considered first, orifice set 66 could be considered second, and orifice set 60 third, or any other combination of first, second, and third for those three sets of orifices.

In a practical implementation strategy fueling orifices 58 may include single holes positioned at a constant radius relative to longitudinal axis 200, and having a circumferential distribution about longitudinal axis 200 at radially outward locations so as to inject fuel directly into incoming flows of air entering channels 50. Orifices 60 may also include single holes analogously arranged, and having a circumferential distribution at radially inward locations. Orifices 66 may be formed in structures 52 in a practical implementation strategy and can be seen to be located at a constant radius relative to longitudinal axis 200, and having uniform circumferential spacing among individual groups of orifices within each structure 50, and having axial distributions within each individual group. Also shown in FIG. 4 are bolt holes 54 formed in each of vanes 52 that can be used for coupling a nozzle 44 to premixer 48 that defines a nozzle opening 45 structured to fluidly connect to combustor 14. Nozzle 44 can be arranged coaxially with pilot assembly 103, thus nozzle 44 or nozzle opening 45 could be understood as defining axis 200. FIG. 4 best illustrates fueling orifices 58 opening to back side 51 of premixer 48, and fuel feed openings 64 that convey fuel to fueling orifices 66. In a practical implementation strategy sets 58, 60, and 66 may each have different total flow areas. In a further practical implementation strategy, a total flow area of orifices 66 may be greater than a total flow area of either of orifices 58 or orifices 60, and a total flow area of orifices 58 can be greater than a total flow area of orifices 60. The relative flow areas and orifice sizes and number can be based on various factors, including desired pressure drop across injector 26. As alluded to above, in general greater total flow area is made available for lower calorific value fuel, and lesser total flow area made available for higher calorific value fuel. The manner in which the various fueling orifices are made available for various fuel delivery patterns will be further apparent from the following description.

Figure 6:
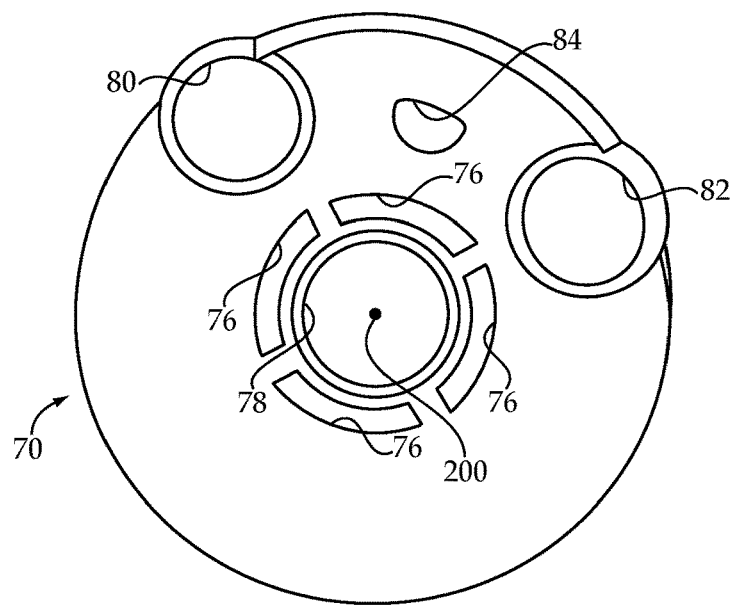
FIG. 6 is a back view of a distributor suitable for use in a fuel injector, according to one embodiment.
Figure 7:
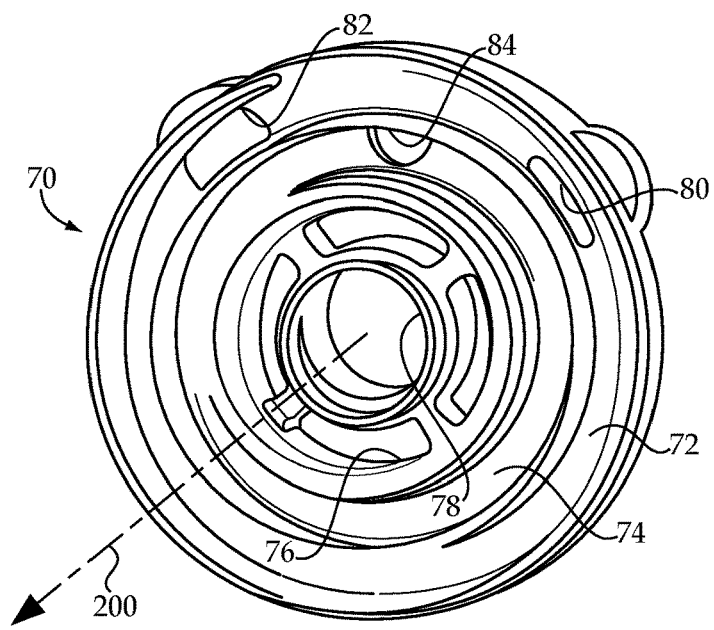
FIG. 7 is a front view of the distributor of FIG. 6.

Referring also now to FIGS. 6 and 7, there are shown back and front views of a distributor 70 of fuel injector 26. It can be seen from FIG. 3 that distributor 70 couples to premixer 48 and to pilot assembly 103. It can further be noted that distributor 70 forms a first fuel gallery 62 fluidly connecting a first one of fuel supply conduits 36, 38, 40 and 42 with fueling orifice sets 58 and 66, and a second fuel gallery 68 fluidly connecting a second one of fuel supply conduits 36, 38, 40 and 42 with fueling orifice set 60. In a practical implementation strategy, first fuel gallery 62 can be fed by multiple fuel supply conduits and thus both conduits 36 and 40, for example, may serve as main fueling conduits that feed gallery 62. Although not visible in FIG. 3 conduit 42 may feed second fuel gallery 68. From FIG. 7 it can be seen that an outer groove 72 is formed in distributor 70 and is circumferential of longitudinal axis 200, which extends through a center opening 78 of distributor 70. Outer groove 72 forms fuel gallery 62 at least in part, such that fuel conveyed to distributor 70 from any of fuel supplies 20, 22, and 24 can generally be uniformly supplied to orifices 58 and to fuel feed openings 64. Distributor 70 may further include an inner groove 74 that is also circumferential of longitudinal axis 200 and forms fuel gallery 68 at least in part, such that fuel conveyed to distributor 70 from any of fuel supplies 20, 22, and 24 can generally be uniformly supplied to orifices 60. Center opening 78 can be coupled with the one of the fuel supply conduits that feeds fuel to pilot assembly 103. A second opening 80 and a third opening 82 are structured to couple with and receive the fuel supply conduits that feed first fuel gallery 62. A fourth opening 84 couples with and receives the fuel supply conduit that feeds second fuel gallery 68. As noted above adjusting a position of a valve within mechanism 32, for example, can change the type of fuel that is supplied to one of the fuel supply conduits, such that different fuels are conveyed through a common fuel supply conduit at different times. A plurality of air inlets 76 are arranged circumferentially about center opening 76 in the illustrated embodiment and feed air to passage 100. As suggested above, openings 80 and 82 may serve to receive fuel supply conduits providing a main primary feed, and opening 84 may serve to receive a fuel supply conduit providing a main secondary feed. Fuel supply conduits and fuel passages that are not used to deliver fuel at any given time can be purged with a purging gas such as nitrogen or compressor discharge air.

The difference in size and number of openings feeding the respective galleries is based at least in part on the desire to accommodate the different size and number of fuel supply conduits so as to accommodate the different flow rates of different calorific value fuels as described herein. Relatively lower calorific value fuel might be fed by way of each of openings 80 and 82 to first fuel gallery 62 and also by way of opening 84 to second fuel gallery 68, and by way of opening 78 to one of fuel passages 41 and 43 that feeds pilot assembly 103. Medium calorific value fuel may be fed by way of only openings 80, 82, and 78. Relatively higher calorific value fuel may be fed by way of openings 84 and 78 only. Thus, it can be appreciated that fuels with a lower calorific value or lower Wobbe index can be injected through all the available fueling orifices, fuels with a medium calorific value or medium Wobbe index can be fed through some but not all of the available fueling orifices, and fuels with a higher calorific value can be fed through still fewer of the fueling orifices. This flexibility in source fuel can be achieved without engine downtime or performance or emissions degradation, and will be further apparent by way of the example operating methodology discussed below.

INDUSTRIAL APPLICABILITY

Referring to the drawings generally, operation of engine 10 according to one strategy can include staged fueling of engine 10 by way of injecting a first gaseous fuel, such as an ultra-low Wobbe biomass fuel, into an incoming flow of air through fuel injector 26 at a first time, and conveying a mixture of the first gaseous fuel and air into combustor 14 so as to operate engine 10 on the first gaseous fuel. In this instance, one of the plurality of different fuel supplies such as fuel supply 20 can be fluidly connected by way of mechanism 32, for example, to first fuel gallery 62 and also to second fuel gallery 68. Hence, the injection of the first gaseous fuel may occur through orifices 58, orifices 60, and orifices 66. For purposes of the present description, orifices 58 and 66 could be considered a first set of fueling orifices, and orifices 66 could be considered a second set of fueling orifices. Injection orifice 119 could be considered a third set. The first gaseous fuel flows continuously to injector 26 and is mixed in injector head 28 with air in the manner described herein, and thenceforth conveyed into combustor 14. The air may be compressed air supplied from a compressor in a gas turbine engine for example.

As the fueling orifices through which the first gaseous fuel is delivered may be within premixer 48, the incoming flow of air and the injected fuel may be swirled by way of interacting with structures/vanes 52. Generally, the swirling action will be imparted to whatever mixture of air and fuel is currently used, although it can be appreciated that the flow dynamics and flow patterns of fuel may be slightly different depending upon the location of the fuel delivery. In parallel with the injection of the first gaseous fuel by way of fueling orifices in premixer 48 the same first gaseous fuel can be supplied to pilot assembly 103. As mentioned above, a lower calorific value fuel might be supplied by way of passage 100, whereas a higher calorific value fuel might be supplied by way of passage 110. As discussed above, the gaseous fuel flow rates may be such that the mixture of air and fuel delivered to combustor 14 is stoichiometrically lean. Combustion can be dry in that water injection for combustion cooling is not employed.

When it is desirable to switch fuel types, mechanism 32 can be operated to change fluid connections among fuel supplies 20, 22, and 24, and fuel supply conduits 36, 38, 40, 42 as appropriate to commence flowing a second gaseous fuel to main fueling assembly 46 and pilot fueling assembly 103. The second gaseous fuel may include a higher calorific value fuel, for instance, that may be injected according to a second fuel delivery pattern into an incoming flow of air through fuel injector 26 at a second time, and conveying a mixture of the second gaseous fuel and air into the combustor so as to operate engine 10 on the second gaseous fuel. In the first instance, injecting of the first gaseous fuel can include injecting the first gaseous fuel through a plurality of the fueling orifices, such as orifice sets 58 and 66, having a relatively greater total flow area. In the second instance, injecting the second gaseous fuel can include injecting the second gaseous fuel through a plurality of the fueling orifices such as orifice set 60. Fuel delivery in either case can include delivering gaseous fuel for pilot fueling to pilot assembly 103, thus injection outlet 96 can be considered a fueling orifice for purposes of apportioning the first gaseous fuel and apportioning the second gaseous fuel for injection among the plurality of sets of fueling orifices. At later times, engine 10 might be switched back to operating on the first gaseous fuel, or transitioned to operating on a third gaseous fuel.

From the foregoing description it will be appreciated that engine 10 is equipped to operate with a single fuel injector type on a range of fuels, including hydrogen-rich fuels. Prior designs tended to be purpose-built for operation on a single fuel type, or at least fuel types with a relatively narrow range of Wobbe index. In the present disclosure, the placement of fuel delivery/injection, the size of fueling orifices, and still other factors enable such flexibility. It is contemplated that dry, premixed lean burn operation without risk of flashback, and without compromising emissions, is possible for fuels having a Wobbe index of about 200 Btu/scf, or possibly lower, and as high as about 1500 Btu/scf, or more.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon examination of the attached drawings and appended claims.

What is claimed is:

1. A method of fueling a combustion engine comprising:
   injecting a first gaseous fuel according to a first fuel delivery pattern into an incoming flow of air through a fuel injector at a first time by way of fueling orifices formed in a swirler of the fuel injector;
   conveying a mixture of the first gaseous fuel and air into a combustor of the combustion engine so as to operate the combustion engine on the first gaseous fuel;
   injecting a second gaseous fuel according to a second fuel delivery pattern into an incoming flow of air through the fuel injector at a second time by way of fueling orifices formed in the swirler;
   conveying a mixture of the second gaseous fuel and air into the combustor so as to operate the combustion engine on the second gaseous fuel; and
   swirling the incoming flow of air and the injected first gaseous fuel and injected second gaseous fuel by way of vanes of the swirler that are stationary relative to the incoming flow of air and the injected first gaseous fuel and injected second gaseous fuel;
   wherein the first fuel delivery pattern includes injection of the first gaseous fuel through a plurality of the fueling orifices having a relatively greater total flow area, and the second fuel delivery pattern includes injection of the second gaseous fuel through a plurality of the fueling orifices having a relatively lesser total flow area; and
   wherein some of the plurality of the fueling orifices through which the first gaseous fuel is injected according to the first fuel delivery pattern and some of the plurality of the fueling orifices through which the second gaseous fuel is injected according to the second fuel delivery pattern are the same fueling orifices.

2. The method of claim 1 wherein the injecting of the first gaseous fuel includes injecting a relatively lower calorific fuel, and the injecting of the second gaseous fuel includes injecting a relatively higher calorific fuel.

3. The method of claim 2 wherein the first gaseous fuel has a Wobbe index of 200 BTU/scf or less.

4. The method of claim 3 wherein the second gaseous fuel has a Wobbe index of 1000 BTU/scf or greater.

5. A method of fueling a combustion engine comprising:
   injecting a first gaseous fuel according to a first fuel delivery pattern into an incoming flow of air through a fuel injector at a first time by way of fueling orifices formed in a swirler of the fuel injector;
   conveying a mixture of the first gaseous fuel and air into a combustor of the combustion engine so as to operate the combustion engine on the first gaseous fuel
   injecting a second gaseous fuel according to a second fuel delivery pattern into an incoming flow of air through the fuel injector at a second time by way of fueling orifices formed in the swirler;
   conveying a mixture of the second gaseous fuel and air into the combustor so as to operate the combustion engine on the second gaseous fuel; and
   swirling the incoming flow of air and the injected first gaseous fuel and injected second gaseous fuel by way of vanes of the swirler that are stationary relative to the incoming flow of air and the injected first gaseous fuel and injected second gaseous fuel;
   wherein the first fuel delivery pattern includes injection of the first gaseous fuel through a plurality of the fueling orifices having a relatively greater total flow area, and the second fuel delivery pattern includes injection of the second gaseous fuel through a plurality of the fueling orifices having a relatively lesser total flow area; and
   wherein the injecting of the first gaseous fuel further includes injecting the first gaseous fuel through a first set of the fueling orifices and a second set of the fueling orifices, and wherein the injecting of the second gaseous fuel further includes injecting the second gaseous fuel through the second set of the fueling orifices but not the first set.

6. The method of claim 5 wherein the first set of the fueling orifices are located at an upstream location, and the second set of the fueling orifices are located at a downstream location.

7. The method of claim 6 wherein the first set of the fueling orifices includes fueling orifices formed in the vanes of the swirler.

8. The method of claim 7 wherein the second set of fueling orifices includes fueling orifices formed in a base of the swirler.

9. A method of staged fuel delivery in a combustion engine comprising:

injecting a first gaseous fuel from at least some of a plurality of fueling orifices into an incoming flow of air through a swirler in a fuel injector, such that the fuel injector conveys an outgoing flow containing a mixture of air and the first gaseous fuel into a combustor of the combustion engine;

injecting a second gaseous fuel from at least some of the plurality of fueling orifices into an incoming flow of air through the swirler in the fuel injector, such that the fuel injector conveys an outgoing flow containing a mixture of air and the second gaseous fuel into the combustor;

apportioning the first gaseous fuel for injection among the plurality of fueling orifices according to a first fuel delivery pattern;

apportioning the second gaseous fuel for injection among the plurality of fueling orifices according to a second fuel delivery pattern; and swirling the incoming flow of air and the injected first gaseous fuel and injected second gaseous fuel by way of vanes of the swirler that are stationary relative to the incoming flow of air and the injected first gaseous fuel and injected second gaseous fuel;

wherein the first gaseous fuel includes a relatively lower calorific fuel, and the second gaseous fuel includes a relatively higher calorific fuel.

10. The method of claim 9 wherein apportioning the first gaseous fuel and apportioning the second gaseous fuel each include apportioning among at least two sets of the fueling orifices.

11. The method of claim 10 wherein at least one of the sets of fueling orifices includes a pilot fueling orifice.

12. The method of claim 10 wherein the at least two sets of fueling orifices include an upstream set and a downstream set.

13. The method of claim 10 further comprising feeding the first gaseous fuel to three of the sets of fueling orifices for injection, and feeding the second gaseous fuel to two of the sets of fueling orifices for injection.

14. The method of claim 9 wherein the first gaseous fuel includes a biomass fuel.

15. The method of claim 9 further comprising adjusting a position of a valve within a fueling manifold so as to supply the first gaseous fuel and the second gaseous fuel to the fuel injector through a common fueling supply conduit at different tunes.

* * * * *